April 21, 1942.　　　A. A. VARELA,　　　2,280,109
BEAT FREQUENCY ALTIMETER
Filed April 7, 1941　　　2 Sheets-Sheet 1
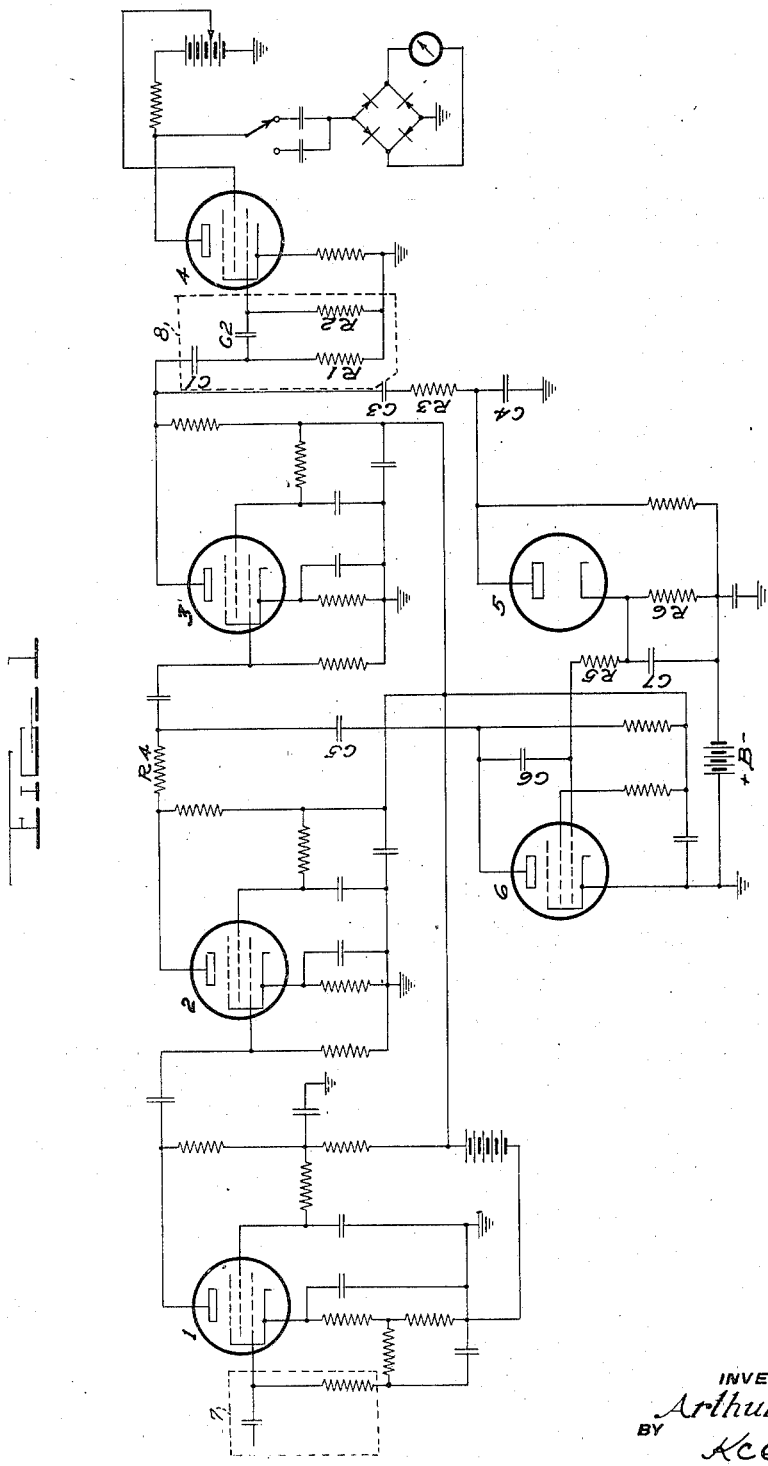
INVENTOR
Arthur A. Varela
BY
K C Caldwell
ATTORNEY

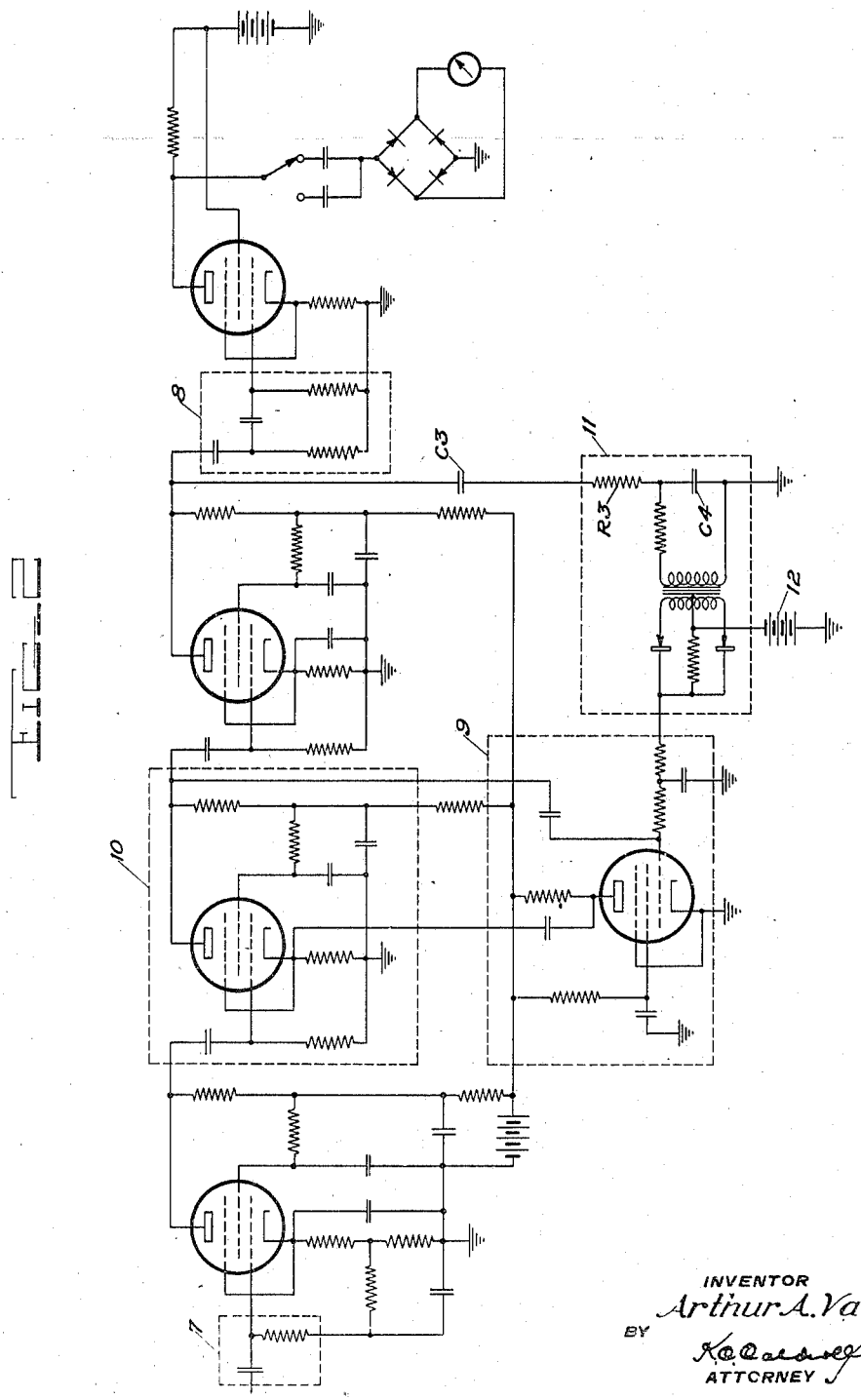

Patented Apr. 21, 1942

2,280,109

UNITED STATES PATENT OFFICE 2,280,109

BEAT FREQUENCY ALTIMETER

Arthur A. Varela, Washington, D. C.

Application April 7, 1941, Serial No. 387,136

6 Claims. (Cl. 250—1)

(Granted under the act of March 3, 1883, as amended April 30, 1928; 370 O. G. 757)

This invention relates to beat frequency radio altimeters and more particularly to an improvement in such altimeters of a type recently introduced, wherein a high frequency transmitter is frequency modulated and a received echo signal from the ground is mixed with the direct signal from the transmitter to give a beat signal, the frequency of which is a function of the altitude above ground.

In the beat frequency amplifier in such an altimeter, it is necessary that the normal gain increase with frequency because the beat frequency signal decreases in strength as the frequency increases due to correspondingly increasing altitude.

It is further found necessary to provide automatic attenuation of the high end when the beat signal is on a low frequency because harmonics and high frequency noise may produce false readings on the frequency meter under such conditions.

In current practice these features are obtained in a beat frequency amplifier by providing, first, an input filter to give the desired rising gain with frequency, and second, an inverse feedback tube with high-pass filter input and a rectifier system responsive to high frequency signals controlling the transconductance of said inverse feedback tube so that the degeneration is removed when sufficiently strong high frequency signals are present. The rectifier or demodulator system operates from the output of the amplifier and this necessitates the use of an additional tube to block out the inverse feedback tube in the event of the reception at high altitudes of signals having a strength which is nil or very weak.

It is an object of this invention to provide the desired gain increase with frequency and automatic attenuation of high frequency reception when the beat signal is on a low frequency, by the utilization of a simpler, more efficient and more reliable circuit than those heretofore known in the art.

The foregoing object is attained preferably by employing the lower frequency signals to provide the bias to control attenuation of high frequencies. It is further preferred to insert most of the low frequency attenuation in the output of the amplifier preceding the frequency meter tube and to employ a vacuum tube as a shunt impedance to obtain the desired high frequency attenuation.

Referring to the accompanying drawings:

Fig. 1 is a diagrammatic showing of the circuits involved in the preferred form of this invention, and Fig. 2 is a diagrammatic showing of the circuits involved in a second embodiment of the invention.

In the drawings, reference characters 1, 2 and 3 indicate amplifier tubes connected as shown in U. S. Patent No. 2,206,896 with some changes which will be described hereinafter. This amplifier has a flat frequency response over the range employed. A high pass filter 8 composed of elements $C_1$, $C_2$, $R_1$, $R_2$ connects the output of the amplifier to the frequency meter tube 4 the output circuit of which is identical with that of tube 72 of the above mentioned patent. While the input coupling circuit 7, which is similar to the attenuating circuit 21 of the above mentioned patent, may be retained to provide some attenuation of low frequencies, most of such attenuation is provided by the high pass filter 8. The amplifier tubes are provided with conventional circuits for supplying screen and anode voltages and are coupled together through resistance-capacitance circuits of the usual type. The output of the tube 1 is connected through a conventional resistance-capacitance circuit to the input of the second amplifier tube 2 which is in turn coupled through a similar circuit to the input of the third amplifier tube 3. The amplifier output also goes direct to rectifier tube 5 which may be a diode as shown, through a low pass filter $R_3$, $C_4$. The diode cathode resistor $R_6$, with filter condenser $C_7$, connects with the control grid of the attenuator tube 6 through a high resistor $R_5$. The time constant of $C_7$ in conjunction with $R_6$ is long enough to provide sufficient filter action for the lowest modulation frequency. The plate of tube 6 is tied to the plate of tube 2 through $C_5$, $R_4$ and to its own grid by a small condenser $C_6$. A source of e. m. f. indicated at B affords a blocking bias on tube 6 in the absence of diode current. The capacitor $C_3$ is a relatively large blocking condenser. The value of $R_3$ can be equal to the reactance of $C_4$ at approximately the center of the modulation band.

In the circuit shown $C_6$ and $R_5$ provide high pass coupling between plate and grid of tube 6 so that the plate impedance falls to a very low value $$\left(\text{nearly } \frac{1}{gm}\right)$$

at the high end of the frequency range and this attenuates the amplifier gain in the desired fashion. In the absence of low frequency signals tube 6 is blocked and the full gain is had on the high frequency.

Tube 6 may also be connected as an inverse feedback tube as in Patent No. 2,206,896. This latter form of the invention is illustrated in Figure 2. The circuit involved in this embodiment is similar to that shown in Patent No. 2,206,896, except in the following particulars. The input coupling circuit 7 gives little or no attenuation to the lower frequencies, the desired attenuation being transferred to an output filter 8. The degenerative tube circuit 9 provides a variable decrease in gain with frequency in the amplifying stage 10. The rectifier circuit 11 having a response rising with decreasing frequency provides a bias obtained from the signal to control the action of circuit 9. In the absence of signal output the degenerative tube of circuit 9 is blocked by the negative potential 12 and high frequency attenuation is absent. A low frequency signal produces a counter-potential permitting action of circuit 9 which action results in high frequency attenuation. $C_4$ and $R_3$ constitute a low pass filter as in Figure 1 which during the reception of a high frequency signal prevents the operation of circuit 11 and thus allows the tube of degenerative circuit 9 to remain blocked.

It should be understood that the practice of the invention is not limited to the embodiments illustrated and described but only by the scope and limitations of the appended claims.

The invention described herein may be manufactured and/or used by or for the Government of the United States of America for governmental purposes without the payment of any royalties thereon or therefor.

I claim:

1. In a beat frequency altimeter comprising a multi-stage amplifier for amplifying a beat frequency signal and means for measuring the frequency of said signal, each of said amplifier stages having an output circuit; a high pass filter connecting the output of said amplifier to said measuring means, a low pass filter, a rectifier, means impressing the output of said amplifier upon said rectifier through said low pass filter, a thermionic tube comprising a plate and a grid, said plate being connected to said output circuit of one of said amplifier stages, biasing means normally blocking said tube, means impressing the output of said rectifier upon the grid to overcome said biasing means and means providing high pass coupling between said plate and said grid.

2. In a beat frequency altimeter comprising a multi-stage amplifier for amplifying a beat frequency signal and means for measuring the frequency of said signal, each of said amplifier stages having an output circuit; a low pass filter, a rectifier, means impressing the output of said amplifier upon said rectifier through said low pass filter, a thermionic tube comprising a plate and a grid, said plate being connected to one of said output circuits, biasing means normally blocking said tube, means impressing the output of said rectifier upon said grid to overcome said biasing means and means providing high pass coupling between said plate and said grid.

3. In a beat frequency altimeter comprising a multi-stage amplifier for amplifying a beat frequency signal and means for measuring the frequency of said signal, each of said amplifier stages having an output circuit; a high pass filter connecting the output of said amplifier to said measuring means, a thermionic tube comprising a plate and a grid, said plate being connected to one of said output circuits, biasing means normally blocking said tube, means rendered operative by the reception of low frequency signals by said amplifier to impress the output of said amplifier upon said grid in a manner to overcome said bias, and means providing a high pass coupling between said plate and said grid.

4. In a beat frequency altimeter comprising a multi-stage amplifier for amplifying a beat frequency signal and means for measuring the frequency of said signal, each of said amplifier stages having an output circuit; means for attenuating high frequencies during the reception of said signal at low frequencies, said means comprising a thermionic tube having a plate and a grid, means connecting said plate to one of said output circuits, biasing means normally blocking said tube, means operable upon the reception of a low frequency signal by said amplifier to overcome said biasing means and means providing high pass coupling between said plate and said grid.

5. In a beat frequency altimeter comprising a multi-stage amplifier for amplifying a beat frequency signal and means for measuring the frequency of said signal; means for attenuating frequencies above the frequency of said signal, said attenuating means comprising means providing a shunt for the output of one of said amplifier stages, the impedance of said shunt varying inversely with frequency, said shunting means being normally inoperative, and means actuated upon the reception of a low frequency signal by said amplifier to render said shunting means operative.

6. In a beat frequency altimeter comprising a multi-stage amplifier for amplifying a beat frequency signal, and means for measuring the frequency of said signal; a high pass filter connecting the output of said amplifier to said measuring means, a degenerative circuit comprising a thermionic tube coupled across a portion of said amplifier, a grid in said tube, a biasing means normally blocking said tube, a low pass filter, a rectifier circuit, means impressing the output of said amplifier through said low pass filter and said rectifier circuit upon said grid upon the reception of a low frequency signal by said amplifier, thereby unblocking said tube and attenuating the reception of said amplifier to high frequencies.

ARTHUR A. VARELA.